Oct. 26, 1965     W. HILDEBRANDT     3,214,754

RADAR SYSTEM WITH AUTOMATIC THRESHOLD CONTROL

Filed Sept. 4, 1962     2 Sheets-Sheet 1

INVENTOR
Werner Hildebrandt
BY George B. Spencer
ATTORNEY

INVENTOR
Werner Hildebrandt
BY George H. Spencer
ATTORNEY

United States Patent Office 3,214,754
Patented Oct. 26, 1965

3,214,754
RADAR SYSTEM WITH AUTOMATIC THRESHOLD CONTROL
Werner Hildebrandt, Konstanz, Germany, assignor to Telefunken Patentverwertungs - G.m.b.H., Ulm (Danube), Germany
Filed Sept. 4, 1962, Ser. No. 221,377
Claims priority, application Germany, Sept. 4, 1961, T 20,702
24 Claims. (Cl. 343—5)

The present invention relates to a radar apparatus incorporating a target detection device and a device for processing the information derived from the detection device.

Intelligence received by means of radar apparatus can be evaluated, i.e., analyzed and interpreted, by means of suitable automatic data processing equipment. Let it now be assumed, for purposes of the following explanations, that the source of information is a pulse radar system. The transmitter of such a system periodically sends out high-frequency pulses of known pulse width (e.g., one microsecond). If these pulses strike a target, they are reflected and are picked up by the receiver in the form of echo signals. Noise and other types of interference will at times appear as true echo signals, or will eliminate or otherwise prevent true echo signals from being picked up by the receiver, the latter mainly being due to fluctuation of the target and systematic interferences such as are caused by MTI (moving target indication) systems. If a given space is scanned by means of a movable antenna, particularly if a circular area is scanned by means of a rotating antenna, the target will be hit by a plurality of pulses whenever the radiation patterns sweep over the target, the actual number of hits per sweep being dependent on the PRF (pulse repetition frequency), the rotational speed of the antenna, and the beam width or azimuthal beam angle. Assuming the PRF to be one kilocycle (1,000 cycles per second), the rotational speed of the antenna to be one revolution every 10 seconds, and the beam width to be $\frac{2}{3}°$, the target will receive on the average of 20 hits per sweep. Within the duration of one sweep (which, in the above example, will be 20 milliseconds), the target will not have changed its position within the accuracy of measurement of the radar system (in the example, a radial, i.e., distance-to-target accuracy of 150 meters and an azimuthal accuracy of 2 minutes of arc (0°02′)), so that the echo signals are correlated to each other. Thus, it is possible simply by adding $n$ echo signals, in a known manner, to improve the signal-to-noise ratio by a factor $\sqrt{n}$ and to obtain an integrated echo pulse, hereinafter referred to simply as "echo." In view of the relatively limited maneuverability of flying targets, the echoes from one and the same target are correlated—as a function of this maneuverability—from antenna revolution to antenna revolution, so that echo and target can be correlated to each other. A determination is made for each echo to see whether the echo is a true echo, i.e., an echo composed of true echo signals, or whether the echo is a spurious echo, i.e., an echo composed of spurious echo signals, in which latter case the supposed "echo signal" is discarded. The differentiation between usable or true signals and noise signals on the basis of the different high-frequency characteristics of echo signals (for example, by making use of the Doppler effect in order to suppress stationary targets) represents a particular stage of the radar signal processing arrangement which will not be considered at this time.

In general, the processing of intelligence from received radar signals is, in effect, the extraction of information, i.e., the processing involves the retrieval, from the echo signals, of as much true information as possible while at the same time suppressing as much spurious and noise signal as possible. In order to carry out such data processing, appropriate equipment capable of processing and storing information is required. In practice, the speed with which the data processing equipment operates, as well as the capacity of the various storage devices cannot be made overly large but must be kept within reasonable limits, so that the equipment is adapted to handle received information at a reasonable maximum rate, or can absorb a reasonable maximum amount of information. If these limits are exceeded and the equipment swamped with information it cannot process, the entire system may become inoperative. Also, it has been found that processes for correlating radar echos from antenna revolution to antenna revolution (which is done during target tracking) become unstable if there are more than a critical number of spurious echoes, so that in this way, too, the system, upon being fed an excess amount of information, will fail.

It is, therefore, a basic object of the present invention to provide a control system which prevents the data processing system form being subjected to more than the critical number of echoes at a time when the system operates at maximum efficiency and, with this object in view, the present invention resides essentially in a radar system having a target detection or acquisition device and a data processing device, which system incorporates the following improvement: the data processing device has means associated with it which automatically feed back to the detecting device a signal which adapts the threshold of the latter, this being done either as a function of the limit of stability of the tracking process if the data processing device is powerful enough or as a function of the storage capacity and/or the operating speed of the data processing device.

It is known that the influx of information can be limited by automatically controlling the digitalizing threshold in dependence on the average noise level. See Hinckley, op. cit. infra. An arrangement for carrying this out can, if desired, be combined with the control system according to the present invention, whereby an optimum amount of information can be obtained.

According to another feature of the present invention, the target detecting device incorporates a digital-type radar set having a digitalizing stage and a detector stage; and thresholds of both stages are regulated automatically.

According to still another feature of the present invention, the arrangement incorporates an electronic computer calculating, on the basis of received information, the region from which future signals are to be expected, this computer being used for effecting the threshold control.

Additional objects and advantages of the present invention will become apparent upon consideration of the following description when taken in conjunction with the accompanying drawings in which.

Figure 1:
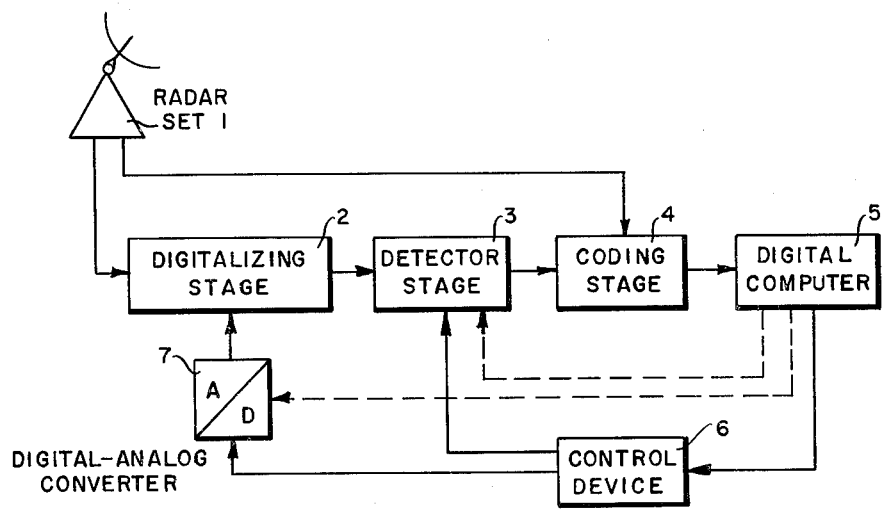
FIGURE 1 is schematic block diagram of a control arrangement according to the present invention.

Referring now to the drawings, FIGURE 1 shows a rotating pulse radar apparatus 1 which incorporates all of the necessary transmitting and receiving devices, including a stationary target suppressing or MTI device. Components 2 and 3 are a digitalizing stage and a detector stage, respectively, and are used for the digital detection or radar echoes, as shown, for example, by G. L. Hinckley in "An Experimental System for Automatic Radar Detection and Digital Coded Plot Extraction and Transmission," Proceedings of the Institute of Electrical Engineers, London, Paper No. 3248E, vol. 107, Part B, Supplement No. 19, 1960. See also F. H. Krantz and W. D. Murray, "A Survey of Digital Methods for Radar Data Processing," Proceedings of the Eastern Joint Computer Conference, 1960, pages 67 through 82. The digitalizing stage 2 serves as an analog-digital converter. The radar line, namely, the received information obtained after a pulse has been transmitted, is (1) divided into equidistant time intervals (in the above example, 1,000 such intervals) which correspond to the width of the transmitted pulse and therefore to the radial resolution (in the example, one microsecond corresponds to 150 meters), and (2) compared with a predetermined threshold value, which will be a given voltage level. Every time the threshold is exceeded, the digital value ONE, representing a hit, will be indicated in the particular time interval (meaning that a target is presumed to be located at the distance in question), while in all other cases the digital value ZERO will be indicated. It is thus possible, by changing this digitalization threshold value, to influence the number of ONES which will appear. If one waits for several radar pulses, then there will be produced in each time interval, i.e., in each discrete distance ring, whose width corresponds to the radial resolution, a sequence of ZERO and ONE, depending on whether or not there is a target at the particular place.

The detector stage 3 stores the ZERO-ONE sequences obtained from all of the distance rings (in the example, 1,000); in particular, the detector stores as many digits (i.e., as many radar lines) as there are average number of hits (in the example, 20). After each transmitter pulse, the ZERO-ONE sequence of each distance ring changes in the storage device, in that a new digit is added and an old digit is discarded, and the detector examines the storage device of each distance ring (in the example, there will thus be one examination every microsecond) to determine its information contents. In the ideal case, the storage device of a distance ring will store only ONES when there is a target present and only ZEROS when there is no target present. Due to noise, however, there will be some ZEROS even when there is a target present, and, similarly, there will be some ONES when there is no target present. The detector must therefore interpret the existence of accumulations of ONES as being indicative of the presence of a target. To this end, the detector relies on a threshold criterion, the arrangement being such that if this threshold criterion is exceeded, a target or echo pulse—or, more precisely, an echo pulse for the particular target—is produced, whereas no such echo pulse is produced if the threshold criterion is not exceeded. It is, of course, possible to change the number of echo signals that are produced by changing this threshold criterion of the detector.

As soon as the detector 3 transmits an echo pulse to a coding stage 4, the latter yields, as its output, the coordinates, in polar or Cartesian form, representing the position of the presumed target. To this end, the coding stage 4 contains counters which are available to represent the actual coordinates. In practice, due consideration is given to the known, fixed time delay to which the echo pulses will be subjected as they pass through the digitalizing and detector stages 2 and 3. The counters are synchronized with the angular rotation of the radar antenna.

The stages 2, 3, 4, operate in synchronism with the radar apparatus 1 and are able to process the data received therefrom at the maximum rate at which the radar apparatus is, theoretically, able to produce the data. In the given example (wherein the azimuthal resolution $=1.5 \cdot \frac{2}{3}°=1°$) this will be $360 \cdot 1000 = 3.6 \cdot 10^5$ targets per antenna resolution. The equipment can not be overloaded with excess information. In the above, the value 1.5 has been selected inasmuch as experience has shown this to be a suitable average factor which insures that the dip between the envelopes of two successive trains of echo pulses will be sufficiently deep to allow these two pulse trains and hence two targets to be distinguished separately. The value 1000 is the number of distance rings used in the example, as stated above.

The correlation of the target echo from antenna revolution to antenna revolution involves the following: (1) the correlation of echoes to already identified targets, i.e., target tracking, (2) the recognition of the first echo of new targets, i.e., the initiation of new targets, (3) the recognition of spurious echoes, and (4) the determination of missing echoes in the case of tracking. These steps are carried out by a digital computer 5, which is disclosed in my co-pending application Serial No. 146,374, filed October 19, 1961, now Patent No. 3,151,322, issued September 29, 1964. The storage capacity and operating speed of this computer will be adequate when the computer can process the incoming echo signals of that number of targets which are in practice, the maximum number of targets that will appear in the space covered by the radar set (for example, 200 targets). Above and beyond this, the capacity of the computer can reasonably still be increased to a point at which that number of echos can be processed and stored which is just below the critical number at which the tracking process becomes unstable.

The system shown in Patent No. 3,151,322, makes use of precalculated regions of expectation or anticipation (each of which is referred to as a regex, an acronym derived from REGion of EXpectation) from which future echoes must emanate if they pertain to a particular target. The size of the regex depends on the maneuverability of the target and on the rotational speed of the antenna. If two target echoes appear in one regex, for example, the true echo plus a spurious echo due to noise, there is no way, at the moment, to differentiate the spurious from the true echo. The anticipated flight path of the target is then considered as dividing itself into two branches and two regexes are then calculated for the next antenna revolution. If the proportion of spurious echos is so large that from each regex there will come two signals, this will initiate a chain reaction which will require the calculation of an ever increasing number of regexes. In practice, the limits of stability of the system will already have been exceeded if there are an average of two echoes from each regex. The average number of spurious echoes per regex is allowed to be only so high that the number of branches obtained always has the tendency to shrink back to the one true flight path. That is to say, branches which were formed due to spurious echoes must, for proper operation of the system, die out on the basis that no echoes appear in their respective regexes, the latter, of course, not being true regexes at all but only apparent regexes. In other words, the probability of spurious echoes, i.e., the spurious echo rate, must be as small as possible with respect to ONE. On the other hand, the probability of discovering a target must be as close as possible to ONE. How far apart these values can be depends on the signal-to-noise ratio and on the effectiveness of the detector. There is, however, the following relationship: the higher the probability of discovery, the higher will be the spurious echo rate. For any particular case, the best discovery probability is obtained if the operation is carried out just below the stability limit of the correlation process. In order to make this possible, and also to prevent the computer from being overloaded, the digital computer should cause, or take over, the regulation of the digitalizing and detector thresholds, this being effected as a function of the number of echoes fed to the digital computer or as a function of the number of spurious echoes determined by the computer, or as a function of the number or regexes carried by the computer.

The place where the measurement for the control loop is taken is in the digital computer 5. The controlled condition is the number of echoes, or the number of spurious echoes. The measurement itself is carried out, per program, by counting. The place where the comparison for the control loop is taken is likewise in the digital computer 5. The value which the control loop should assume, i.e., the reference value, is given primarily by the stability limit of the tracking process. Other reference values are the operating speed and the storage capacity of the computer, insofar as the system is unable to handle an influx of information which corresponds to the limit of stability. The comparison for obtaining the deviation from the reference value is also carried out on a per program basis. The reference value is a parameter of this program and this reference value is set by feeding a corresponding parameter value into the computer.

The difference between the actual and the reference value is applied to the control device 6. The latter determines the setting values for setting the threshold of the digitalizing stage 2 and the threshold for the detector 3. The difference consists, for example, of the numerical difference between the actual value and the reference value of the echoes. From this information, the control device 6 determines a digital setting value for the digitalizing threshold which a digital-analog converter 7 changes into an analog value, the latter being applied to the digitalizing stage 2. The other setting value determined by the control device 6 is applied to the detector 3 in digital form and serves there to set the detector threshold.

Under certain circumstances, it is expedient to let the functions of the control device 6 be carried out by the computer 5 on a per program basis. In that case the computer delivers not the difference between the actual and reference values but the setting values themselves. In this way, the control device 6 can be dispensed with. Going one step further, it is possible for the computer 5 to determine the threshold values directly, so that the same may be applied directly to the digital-analog converter 7 and the detector 3, respectively. This is shown schematically by the dashed lines.

It is essential that, during the controlling action, it be established when, and to what extent, the digitalizing threshold and the detector threshold be actuated. The digitalizing threshold determines the minimum amplitude at which echo signals, i.e., incoming impulses, will be considered as hits. This threshold can be varied between a value of ZERO at which each echo is counted as a hit, and a value of such magnitude that no incoming echo will exceed the threshold value and count as a hit. The detector threshold, on the other hand, determines how many hits must appear per sweep so that the presence of a target can be presumed. (To continue the numerical example, let it be assumed that the detector threshold can be varied between 5 and 15 hits.) What can be done, for instance, is to effect a coarse adjustment by means of the digitalizing threshold and a fine adjustment by means of the detector threshold. This will be explained more fully below. It is remarked, however, that in lieu of this procedure, other courses may be followed, as for example: the digitalizing threshold is adjusted to such a value so as to produce an optimal difference between presumed targets and noise. The actual control of the number of echos is carried out solely by the detector threshold. In any case, however, the principle involved is that if the number of echoes are reduced, it will always be the weakest echoes which are suppressed.

In the illustrated embodiment the computer forms a deviation value in the form of a binary number $\pm \Delta N$, namely, the algebraic sign as well as the rounded eight significant digits ($2^4$ to $2^{11}$) between the actual number and the reference number of echoes ($N_{act} - N_{ref}$), with the four lower digits of the difference (the digits $2^0$ to $2^3$) being dropped. The deviation $\pm \Delta N$ is periodically, e.g., after each antenna revolution, determined by the computer and is applied parallely to the register 8, 9, 10 of the control device 6, shown in FIGURE 2. In this embodiment, the control device 6 serves solely as a converter. The one-digit register portion 8 contains the algebraic sign, the three-digit register portion 9 contains the three lower digits of the difference value $\pm \Delta N$, and the five-digit register portion 10 contains the remaining five digits of that value. So long as the value $\pm \Delta N$ does not exceed 12 binary digits, the register portion 9 contains a three-digit number which indicates multiples of 16 (the binary digits $2^4$ to $2^6$), and the register portion 10 indicates a five-digit number which represents multiples of 128 (the binary digits $2^7$ to $2^{11}$). Furthermore, the computer delivers a constant clock pulse via the input T, which is applied to the AND-circuits 12 and 14.

The register portions 9 and 10 are constituted by binary counters capable of counting backward. As soon as the magnitude $\pm \Delta N$ is transferred from the computer to the counters, each counter will, in general, contain a value other than zero. So long as this is so, the OR-circuits 11 and 13 will transmit a signal to the AND-circuits 12 and 14, respectively, whereupon the clock pulses (1) act as counting pulses on the counters 9 and 10, respectively, and (2) become effective as setting pulses affecting the detector and digitalizing thresholds. With each clock pulse, the contents of the counters is decreased by ONE. As soon as a counter has reached ZERO, the particular OR-circuit associated therewith will no longer transmit a signal to the respective AND-circuit, whereupon the latter will no longer transmit any further clock pulses. In this way, there will always be produced as many setting pulses as are represented by the lower three, or upper five, as the case may be, digits of the magnitude $\Delta N$.

Figure 2:
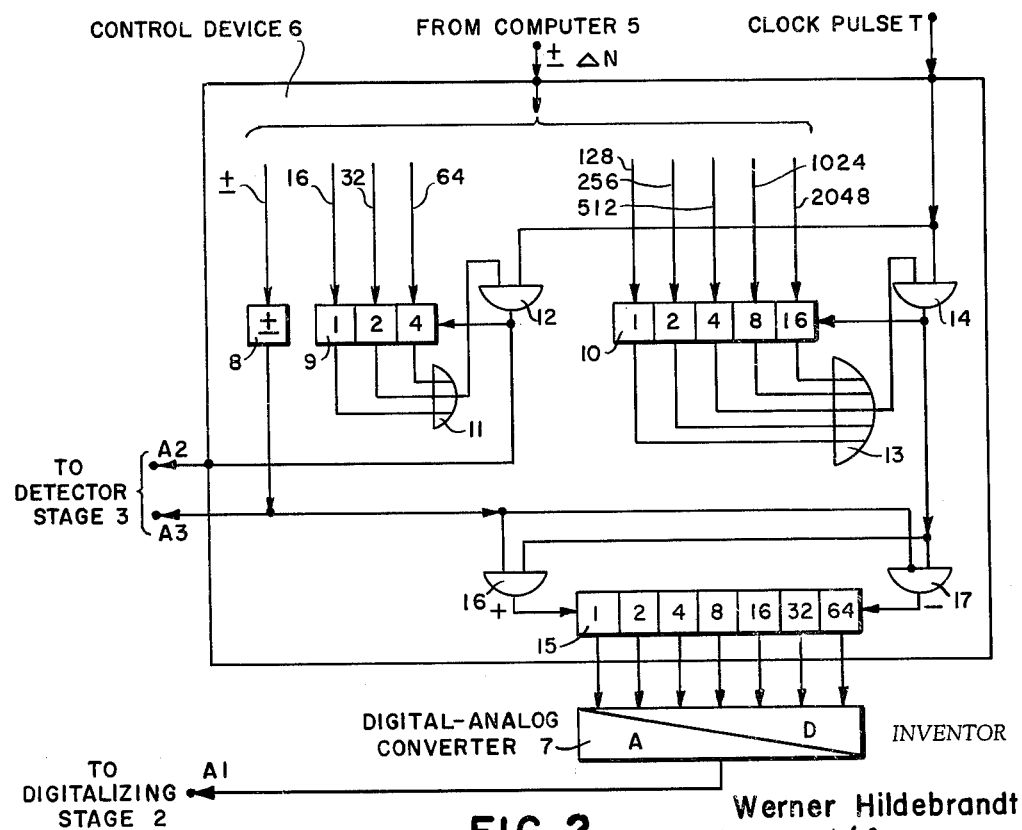
FIGURE 2 is a schematic diagram showing in detail one of the components of the block diagram of FIGURE 1.

The setting pulses coming from the AND-circuit 14 are applied to AND-circuits 16 and 17, the outputs of both of which are applied to a counter 15 capable of counting forward and backward. The output of AND-circuit 16 is connected to the forward counting input, represented by a plus (+) sign, and will deliver a signal when the algebraic sign of $\Delta N$ is negative. The output of AND-circuit 17 is connected to the backward counting input, represented by a minus (−) sign and will deliver a signal when the algebraic sign of $\Delta N$ is positive; this function is obtained by the inhibiting input of AND-circuit 17, as shown in FIGURE 2. The condition of counter 15 will thus always be changed by the amount which is represented by the upper five digits of the deviation $\pm \Delta N$. The digital value of the counter 15 is applied to the digital-analog converter 7 where it is transformed into an analog voltage which represents the setting voltage for the digitalizing threshold, or the threshold voltage itself, as the case may be. This potential, which appears at the output A1, is adjustable; in practice, it is expedient to make the potential adjustable in a stepwise manner, as for example, in 128 steps. The counter 15 will therefore have seven binary digits.

Figure 3:
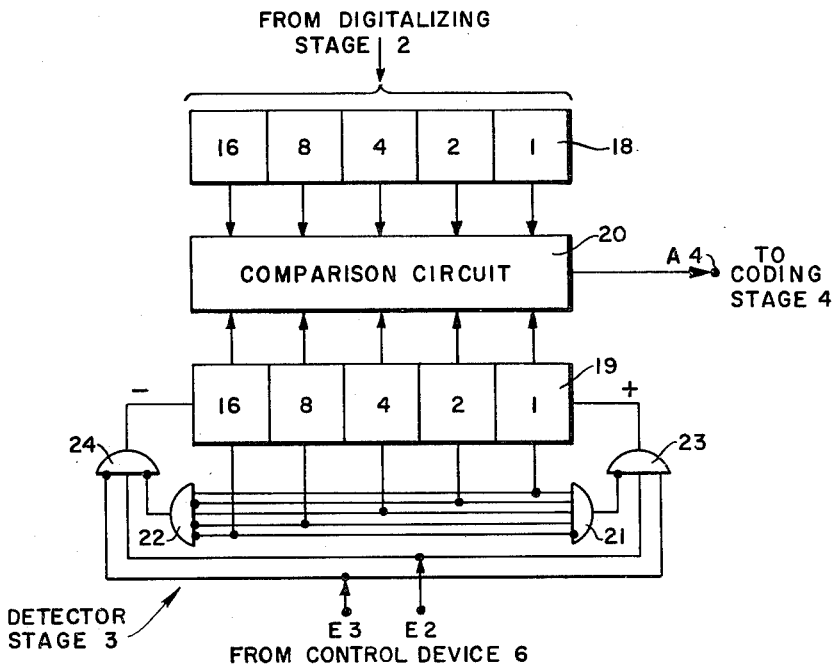
FIGURE 3 is a schematic diagram showing in detail another one of the components of the block diagram of FIGURE 1.

The setting pulses put out by the AND-circuit 12 as well as the pulse corresponding to the algebraic sign are applied, via outputs A2 and A3, to the detector 3. The digital detectors which determine the number of hits by addition (or counting), store the number of hits in a register 18, shown in FIGURE 3, which can be the counter itself. The counter 19 contains the threshold value with which the number of hits recorded by the register 18 is compared, the comparison being done by means of a comparison circuit 20. The setting pulses applied to the detector from output A2 via input E2 vary the detector threshold by increasing or decreasing, as the case may be, the contents of the counter 19 by an amount corresponding to the three lower digits of the deviation ΔN, this being done via the AND-circuits 23 and 24, respectively, under the control of the algebraic sign, via output A3 and input E3. As in the case of counter 15, the counter 19 is likewise able to count forward and backward and corresponds, in operation, to the counter 15. There is a difference, however, in that the counter 19 cannot exceed a certain value (in the example, 15) or drop below a certain value (in the example, 5). This is brought about by AND-circuits 21 and 22, respectively, which decode the limit values and block the AND-circuits 23 and 24, respectively, when the counter 19 reaches the upper or lower limit, respectively.

Figure 4:
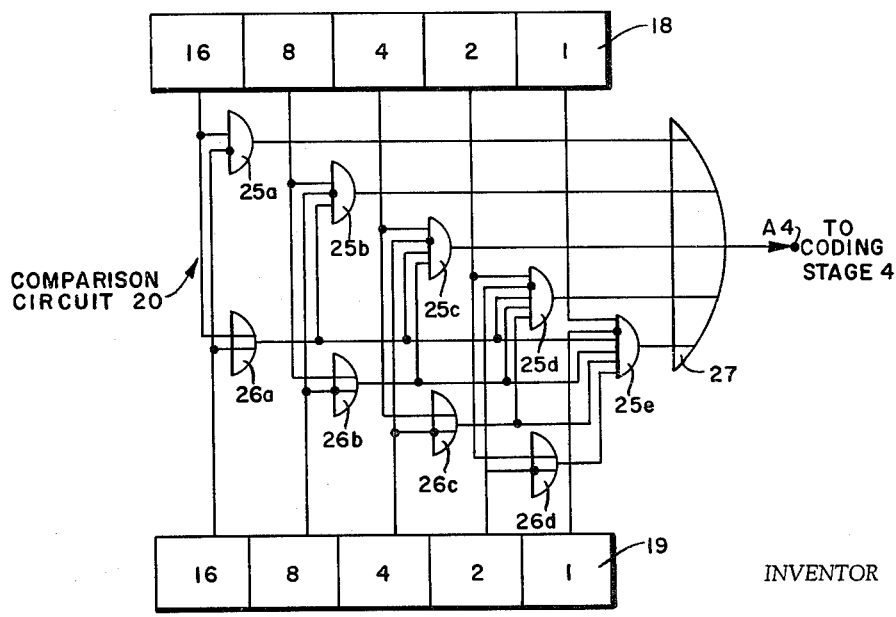
FIGURE 4 shows a detail of the component of FIGURE 3.

FIGURE 4 shows one embodiment of the comparison circuit 20. There will be appear at the output terminal A4 of OR-circuit 27 the digital value ONE when the number in register 18 is larger than that in register 19, and the digital value ZERO when the number in register 18 is smaller than or equal to that in register 19. Each of the AND-circuits 25a, 25b, 25c, 25d, 25e, will produce an output signal only when the respective digit in register 18 has the value ONE and the corresponding digit in register 19 the value ZERO and when all higher digits of register 18 agree with the corresponding digit in register 19 (both either ONE or ZERO) or are larger than these digits (the digits of register 18 are ONE and the corresponding digits of 19 are ZERO). This is controlled by the OR-circuits 26a, 26b, 26c, 26d, whose outputs are connected to inputs of AND-circuits 25b, 25c, 25d, 25e, respectively. If all of the digits of register 18 agree with the corresponding digits of register 19, or if, considered from the highest digit, the first different digit in register 18 has the value ZERO and the corresponding digit in register 19 has the value ONE, none of the AND-circuits 25a through 25e will produce an output signal, and the result appearing at the output of OR-circuit 27 produces the result ZERO. The thus obtained ZERO-ONE sequence, which appears with a periodicity of one microsecond, is applied, via output A4, to the coding stage 4 of FIGURE 1.

In the illustrated embodiment, the setting magnitudes for the potential of the digitalizing threshold in component 2 and the hit-number serving as the detector threshold in component 3 are linearly proportional to the deviation ±ΔN. If necessary, the control device 6 can be refined by equipping it with functional elements capable of producing setting values which bear a more complicated non-linear relationship to the deviation.

It will be seen from the above that, by virtue of the present invention, the radar detector device, particularly the digitalizing and detector stages thereof whose operating thresholds can be adjusted, will be controlled by the data processing device in such a manner that these thresholds are adjusted as a function of the stability of operation of the data processing device. Consequently, there will be fed to the data processing device only so much data as the latter can absorb and still continue to operate under stable conditions.

It will be understood that the above description of the present invention is susceptible to various modifications, changes, and adaptations, and the same are intended to be comprehended within the meaning and range of equivalents of the appended claims.

What is claimed is:

1. In a radar system having a target detection device and a data processing device, the improvement that the data processing device has associated with it means for automatically feeding back to the detecting device a signal controlling the operating threshold of the latter, said means operating in dependence on the limit of stability of the data processing device.

2. The miprovement defined in claim 1 wherein said means operate in dependence on the storage capacity of the data processing device.

3. The improvement defined in claim 1 wherein said means operate in dependence on the operating speed of the data processing device.

4. In a radar system having a target detection device and a data processing device, the improvement that the data processing device has associated with it means for automatically feeding back to the detecting device a signal controlling the operating threshold of the latter, said means comprising a computer for calculating the region of expectation from which future true echo signals will originate.

5. In a radar system having a target detection device and a data processing device, the improvement that the data processing device has associated with it means for automatically feeding back to the detecting device a signal controlling the operating threshold of the latter, said means comprising a computer for calculating setting pulses with which said threshold is set.

6. In a radar system having a target detection device and a data processing device, the improvement that the data processing device has associated with it means for automatically feeding back to the detecting device a signal controlling the operating threshold of the latter, said means comprising a computer for calculating the setting values of said threshold and for applying said values to the target detecting device.

7. In a radar system having a target detection device and a data processing device, the improvement that the data processing device has associated with it means for automatically feeding back to the detecting device a signal controlling the operating threshold of the latter, said means comprising a computer for calculating the threshold values directly and applying the same to the target detecting device.

8. In a digital radar system having (a) a target detecting device incorporating (1) a digitalizing stage and (2) a detector stage and (b) a data processing device, the improvement that the data processing device has associated with it means for automatically feeding back to each of said two stages respective signals which control the respective operating thresholds of said stages.

9. A digital radar system comprising, in combination: a target detecting device whose operating threshold is adjustable; and a data processing device connected to the output of said detecting device and incorporating means connected to said detecting device for adjusting the operating threshold thereof as a function of the stability of operation of said data processing device, whereby said detecting device will feed to said data processing device only so much data as the latter can absorb and still continue to operate under stable conditions.

10. A digital radar system comprising, in combination: a target detecting device incorporating digitalizing and detector stages the operating threshold of each of which stages is adjustable; and a data processing device connected to the output of said detecting device and incorporating means connected to said digitalizing and detector stages for adjusting the respective operating thresholds thereof as a function of the stability of operation of said data processing device, whereby said detecting device will feed to said data processing device only so much data as the latter can absorb and still continue to operate under stable conditions.

11. A digital radar system comprising, in combination:
(a) a radar set including a periodically moved antenna and means for transmitting a series of pulses and for receiving echo pulses reflected by a target, said radar set having an output at which appear signals representing such echo pulses;
(b) a digitalizing stage connected to the output of said radar set, said digitalizing stage having an adjustable operating threshold;
(c) a detector stage connected to the output of said digitalizing stage, said detector stage also having an adjustable operating threshold; and (d) data processing means connected to the output of said radar set and of said detector stage and including means connected to said digitalizing and detector stages for adjusting the respective operating thresholds thereof as a function of the stability of operation of said data processing device, whereby there will be fed to said data processing device only so much data as the latter can absorb and still continue to operate under stable conditions.

12. A digital radar system as defined in claim 11 wherein said detector stage comprises a first register connected to the output of said digitalizing stage for storing the number of hits of said radar set; a second register; a logic circuit connected to and controlled by said data processing means, said logic circuit being connected to said second register for storing therein the threshold value of said detector stage, as calculated by said data processing means; and a comparison circuit connected to the outputs of said first and second registers, the output of said comparison circuit being connected to an input of said data processing means.

13. A digital radar system comprising, in combination:
  (a) a radar set including a periodically moved antenna and means for transmitting a series of pulses and for receiving echo pulses reflected by a target, said radar set having an output at which appear signals representing such echo pulses;
  (b) a digitalizing stage connected to the output of said radar set, said digitalizing stage having an adjustable operating threshold;
  (c) a detector stage connected to the output of said digitalizing stage, said detector stage also having an adjustable operating threshold;
  (d) a coding stage connected to the output of said radar set and of said detector stage; and
  (e) a digital computer connected to the output of said coding stage and producing output values by means of which the operating thresholds of said digitalizing and detector stages are controlled in dependence on the stability of operation of said computer, whereby said computer will have fed to it only so much data as it can absorb and still continue to operate under stable conditions.

14. A digital radar system as defined in claim 13 wherein the output values of said computer are applied to a control device, the latter producing setting values which are applied to said digitalizing and detector stages.

15. A digital radar system as defined in claim 14 wherein the output of said control device is in digital form and is applied to a digital-analog converter, the output of the latter being in analog form and being applied to said digitalizing stage.

16. A digital radar system as defined in claim 14, said control device comprising an algebraic sign containing single-digit register portion, a multiple-digit lower-digit register portion, and a multiple-digit higher-digit register portion, said register portions having inputs connected to the output of said digital computer, the output of said single-digit register portion being connected to an input of said detector stage; a first OR-circuit having inputs connected to the digit outputs of said lower-digit register portion; a first AND-circuit having one input connected to the output of said first OR-circuit and another input connected to a source of clock pulses, the output of said first AND-circuit being connected to another input of said detector stage and also to said lower-digit register portion for applying a counting pulse thereto; a second OR-circuit having inputs connected to the digit outputs of said higher-digit register portion; a second AND-circuit having one input connected to the output of said second OR-circuit and another input connected to the source of clock pulses, the output of said second AND-circuit being connected to said higher-digit register portion for applying a counting pulse thereto; a counter capable of counting forward and backward and having a forward counting input and a backward counting input; a third AND-circuit having one input connected to the output of said algebraic sign containing single-digit register portion, another input connected to the output of said second AND-circuit, and an output connected to the forward counting input of said counter; and a fourth AND-circuit having an input connected to the output of said second AND-circuit, an inhibiting input connected to the output of said algebraic sign containing single-digit register portion, and an output connected to the backward counting input of said counter.

17. A digital radar system as defined in claim 13 wherein said output values produced by said computer are setting values applied to said digitalizing and detector stages.

18. A digital radar system as defined in claim 13 wherein said output values produced by said computer are the threshold values themselves which are applied to said digitalizing and detector stages.

19. A digital radar system comprising, in combination: a target detecting device having a digitalizing stage and a detector stage, each of said stages having an adjustable operating threshold; and means connected to said stages for automatically regulating the respective thresholds thereof.

20. A digital radar system as defined in claim 19 wherein said regulating means comprise an electronic computer which processes data related to the reception, tracking and suppression of target echoes with respect to precalculated regexes, the output of said computer being applied back to at least one of said stages for regulating the threshold of said one stage.

21. A digital radar system as defined in claim 20 wherein said regulating means comprises a further device connected to the other of said stages for regulating the threshold thereof.

22. A method of operating a radar system having a target detecting device and a data processing device, comprising the step of automatically feeding back to the detecting device a signal for controlling the operating threshold of the latter said signal being a function of the storage capacity, and hence of the stability of operation, of the data processing device.

23. A method of operating a radar system having a target detecting device and a data processing device, comprising the step of automatically feeding back to the detecting device a signal for controlling the operating threshold of the latter said signal being a function of the operating speed, and hence of the stability of operation, of the data processing device.

24. A method of operating a radar system having a target detecting device and a data processing device, comprising the step of automatically feeding back to the detecting device a signal for controlling the operating threshold of the latter said signal being a function of the storage capacity and the operating speed and hence of the stability of operation, of the data processing device.

References Cited by the Examiner

UNITED STATES PATENTS 3,035,263  5/62  Lader et al. _____ 343—7.3

CHESTER L. JUSTUS, *Primary Examiner.*